United States Patent
Kim

(10) Patent No.: US 7,413,420 B2
(45) Date of Patent: Aug. 19, 2008

(54) LINEAR COMPRESSOR AND METHOD OF PRODUCING THE SAME

(75) Inventor: Gyeong Don Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 736 days.

(21) Appl. No.: 10/792,630

(22) Filed: Mar. 4, 2004

(65) Prior Publication Data

US 2004/0258543 A1    Dec. 23, 2004

(30) Foreign Application Priority Data

Jun. 20, 2003    (KR) .................. 10-2003-0040275
Jul. 9, 2003     (KR) .................. 10-2003-0046421

(51) Int. Cl.
*F04B 35/00* (2006.01)
(52) U.S. Cl. .................................... 417/417
(58) Field of Classification Search ............. 417/417; 29/888.02, 428, 888; 310/14, 217
See application file for complete search history.

(56) References Cited

U.S. PATENT DOCUMENTS

| | | | | |
|---|---|---|---|---|
| 2,193,141 A | * | 3/1940 | Price | 237/2 A |
| 3,947,155 A | * | 3/1976 | Bidol | 417/417 |
| 6,077,054 A | * | 6/2000 | Lee et al. | 417/417 |
| 6,238,192 B1 | | 5/2001 | Lee | |
| 6,339,876 B1 | * | 1/2002 | Lee | 29/888.02 |

FOREIGN PATENT DOCUMENTS

| | | |
|---|---|---|
| JP | 2000-038985 | 2/2000 |
| JP | 2003-143826 | 5/2003 |
| KR | 10-206849 | 4/1999 |

OTHER PUBLICATIONS

Chinese Office Action Issued with respect to Chinese Patent Application No. 2004100396433, which corresponds to the above-referenced application.

* cited by examiner

*Primary Examiner*—Devon Kramer
*Assistant Examiner*—Vikansha Dwivedi
(74) *Attorney, Agent, or Firm*—Staas & Halsey LLP

(57) ABSTRACT

A linear compressor and a method of producing the linear compressor which do not generate eddy currents in an inside stator of a linear motor thereof, thus preventing an eddy current loss, caused by an electrical contact between a plurality of thin metal sheets of the inside stator. The linear compressor includes a cylinder having a piston therein, a magnet arranged around the cylinder to actuate the piston, and the inside stator arranged around the cylinder to be placed inside the magnet. The inside stator has the thin metal sheets arranged in a cylindrical arrangement, and a holder which is made of a nonconductive resin material and to which the thin metal sheets are insert-molded to be held in positions thereof in the cylindrical arrangement. Due to the nonconductive holder, the thin metal sheets are prevented from being in electrical contact with each other, and the linear compressor does not generate any eddy currents in the inside stator, and prevents an eddy current loss.

10 Claims, 6 Drawing Sheets

LINEAR COMPRESSOR AND METHOD OF PRODUCING THE SAME

CROSS-REFERENCE TO RELATED APPLICATIONS

This application claims the benefit of Korean Patent Application No. 2003-40275 filed on Jun. 20, 2003 and Korean Patent Application No. 2003-46421 filed on Jul. 9, 2003 in the Korean Intellectual Property Office, the disclosures of which are incorporated herein by reference.

BACKGROUND OF THE INVENTION

1. Field of the Invention

The present invention relates, in general, to linear compressors and, more particularly, to a linear compressor which does not generate eddy currents in an inside stator of a linear motor thereof, and to a method of producing the linear compressor.

2. Description of the Related Art

Generally, a linear compressor is a machine that draws and compresses gas refrigerant in a refrigerating system or an air conditioning system, such as a refrigerator or an air conditioner, which is operated by running a refrigeration cycle.

A conventional linear compressor includes a hermetic casing that defines an appearance of the linear compressor, with a linear motor and a compression unit both being housed in the hermetic casing. The linear motor generates the driving power when the linear motor is turned on by electricity supplied from an external power source, while the compression unit draws gas refrigerant and compresses the refrigerant using the driving power of the linear motor.

The compression unit includes a cylinder block, with a cylinder provided at a central portion of the cylinder block to define a compression chamber therein. A cylinder head is assembled with a lower end of the cylinder block to guide inlet and outlet gas refrigerant relative to the compression chamber of the cylinder. That is, the cylinder head has a suction valve to allow the inlet gas refrigerant to enter the compression chamber, and an exhaust valve to allow the outlet gas refrigerant to be discharged from the compression chamber. A piston is movably received in the compression chamber of the cylinder to linearly reciprocate in the compression chamber using the driving power of the linear motor.

The linear motor includes an inside stator, an outside stator, and a slider. The inside stator has a cylindrical shape and is placed around the cylinder, while the outside stator has a cylindrical shape and is installed around the inside stator to surround the inside stator, with an interval defined between the inside and outside stators. The slider is interposed between the inside and outside stators to linearly reciprocate in an axial direction of the inside and outside stators. The slider has a magnet that cooperates with the inside and outside stators so as to linearly move the piston in the cylinder.

The inside stator has a plurality of thin metal sheets, which are thin steel sheets, as an example, and are arranged around a circumferential surface of the cylinder while being directed in a radial direction, thus forming a cylindrical arrangement. To arrange the thin metal sheets around the circumferential surface of the cylinder to form the cylindrical arrangement, first ends of the thin metal sheets are held by a holder provided on the circumferential surface of the cylinder. Second ends of the thin metal sheets are welded together to maintain the cylindrical arrangement of the thin metal sheets.

However since the thin metal sheets are welded together to maintain the cylindrical arrangement as described above, an electrical contact is formed between the welded metal sheets during a process of welding the metal sheets to produce the inside stator. Therefore, when the slider linearly reciprocates in the axial direction of the inside and outside stators during an operation of the linear compressor, eddy currents are generated in the inside stator, resulting in an eddy current loss to reduce operational performance of the linear compressor.

SUMMARY OF THE INVENTION

Accordingly, it is an aspect of the present invention to provide a linear compressor and a method of producing the linear compressor which do not generate eddy currents in an inside stator of a linear motor thereof, thus preventing an eddy current loss, caused by an electrical contact between a plurality of thin metal sheets of the inside stator during a conventional process of welding the thin metal sheets together to produce the inside stator.

The above and/or other aspects are achieved by providing a linear compressor, comprising: a cylinder having a piston therein; a magnet arranged around the cylinder to actuate the piston; and an inside stator arranged around the cylinder to be placed inside the magnet, the inside stator including: a plurality of metal sheets arranged in a cylindrical arrangement; and a holder to which the metal sheets are insert-molded, with upper edges, inside edges and lower edges of the metal sheets being covered with the holder, thus allowing the metal sheets to be held in positions thereof in the cylindrical arrangement.

In the linear compressor, each of the metal sheets may have a locking notch on at least one of the upper and lower edges thereof, thus being locked to the holder at the locking notch to be prevented from being removed from the holder.

In the linear compressor, the holder may have a locking member which is internally-threaded at an end thereof to allow the inside stator to be locked to the cylinder at the locking member, the locking member being insert-molded to the holder.

In the linear compressor, the holder may be thicker, at a lower portion thereof which covers the lower edges of the metal sheets, than an upper portion thereof which covers the upper edges of the metal sheets, so that the holder may receive the locking member in the lower portion thereof.

In the linear compressor, the holder may have a thickness of 1 mm-3 mm at the upper portion thereof which covers the upper edges of the metal sheets.

In the linear compressor, the holder may be made of a nonconductive resin material.

The linear compressor may further include a thick part provided along an end of an inner surface of the holder to allow the holder to be placed around the cylinder, with a gap defined between the inner surface of the holder and an outer surface of the cylinder.

In the linear compressor, the inside stator may be arranged in a vertical direction, and an oil groove may be formed on the thick part of the holder in the vertical direction to allow oil to flow along the thick part in the vertical direction.

The linear compressor may further includes a projection provided on a lower end of the holder to allow the holder to be placed on a cylinder block having the cylinder, with a gap defined between the lower end of the holder and the cylinder block by the projection.

In the linear compressor, each of the metal sheets may have at least one embossment which forms a protuberance and a recess on both sides of each of the metal sheets, so that the embossment of each of the metal sheets may be assembled with the embossment of a neighboring metal sheet.

In the linear compressor, the embossment of each of the metal sheets may include a plurality of embossments which are formed along an axial line adjacent to an inside edge of each of the metal sheets arranged in the cylindrical arrangement.

The above and/or other aspects are achieved by providing a method of producing a linear compressor, including: producing a metal sheet from a metal plate; forming an embossment on the metal sheet; assembling a plurality of metal sheets with each other by using the embossment of each of the metal sheets, thus providing a metal sheet assembly; bending the metal sheet assembly into a cylindrical shape to allow the metal sheets to be arranged in a cylindrical arrangement; and forming a holder to hold the metal sheets in positions thereof in the cylindrical arrangement.

In the method, the plurality of metal sheets may be produced by cutting the metal plate through a pressing process, after a plurality of embossments are formed on the metal plate.

In the method, the plurality of metal sheets may be produced by cutting the metal plate by using a press, one by one, and the metal sheets may be sequentially assembled with each other at the embossment of each of the metal sheets by using the press, thus providing the metal sheet assembly.

In the method, a plurality of embossments may be formed on the metal plate, and, thereafter, the plurality of metal sheets may be produced through a pressing process in which the metal plate having the embossments is cut into the metal sheets.

In the method, the embossment may be formed on each of the metal sheets at a position adjacent to a side edge of each of the metal sheets, thus allowing the metal sheet assembly to be bent into the cylindrical shape such that the metal sheets are arranged in the cylindrical arrangement.

In the method, the bending of the metal sheet assembly into the cylindrical shape to allow the metal sheets to be arranged in the cylindrical arrangement, may further include: locking a protuberance part of the embossment of a metal sheet placed at a first end of the metal sheet assembly to a recess part of the embossment of another metal sheet placed at a second end of the metal sheet assembly.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of embodiments of the invention, taken in conjunction with the accompanying drawings of which.

DETAILED DESCRIPTION OF THE PREFERRED EMBODIMENTS

Figure 1:
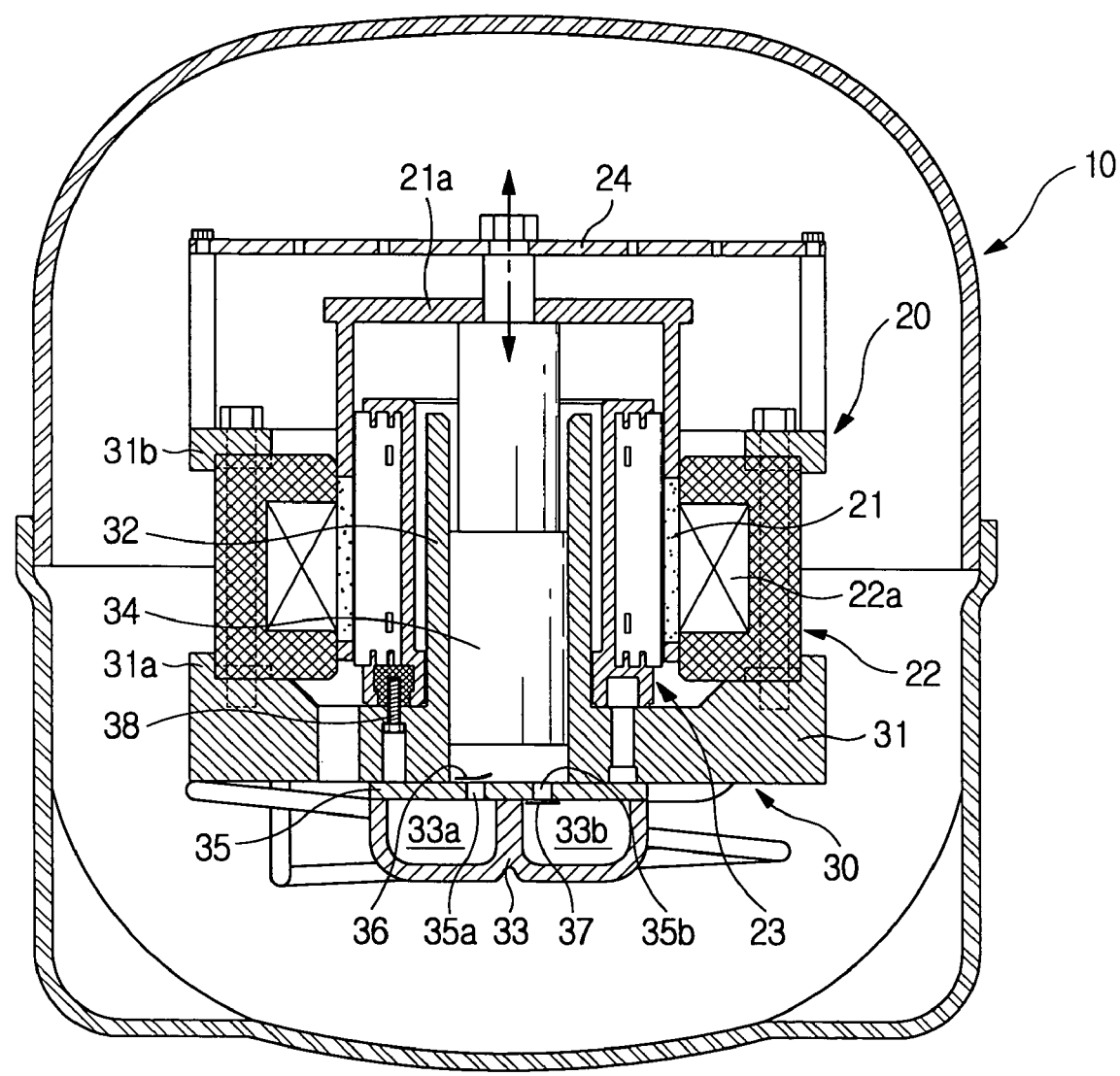
FIG. 1 is a sectional view of a linear compressor, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIG. 1, a linear compressor according to the present invention includes a compression unit 30 and a linear motor 20. The compression unit 30 draws and compresses gas refrigerant which is fed from an evaporation unit of a closed refrigeration circuit included in a refrigerating system or an air conditioning system operated by running a refrigeration cycle. The linear motor 20 generates the driving power to actuate the compression unit 30 when the linear motor 20 is turned on by electricity supplied from an external power source. Both the linear motor 20 and the compression unit 30 are housed in a hermetic casing 10 that defines an appearance of the linear compressor.

In the linear compressor, the compression unit 30 is placed in a lower portion of the hermetic casing 10. The compression unit 30 includes a cylinder block 31, with a cylinder 32 provided at a central portion of the cylinder block 31 to define a compression chamber therein. A cylinder head 33 is assembled with a lower end of the cylinder block 31 to guide inlet and outlet gas refrigerant relative to the compression chamber of the cylinder 32. A piston 34 is movably received in the compression chamber of the cylinder 32 to linearly reciprocate in the compression chamber using the driving power of the linear motor 20.

The cylinder head 33 has a suction chamber 33a to guide the inlet gas refrigerant into the compression chamber of the cylinder 32, and an exhaust chamber 33b to guide the outlet gas refrigerant from the compression chamber of the cylinder 32. A valve plate 35 having both a suction port 35a and an exhaust port 35b is interposed between the cylinder block 31 and the cylinder head 33, with a suction valve 36 and an exhaust valve 37 provided on the valve plate 35 to open or close each of the suction port 35a and the exhaust port 35b in accordance with a linear movement of the piston 34 in the cylinder 32. That is, when the piston 34 is moved upward in the cylinder 32, the suction valve 36 is opened to allow the gas refrigerant from the suction chamber 33a to enter the compression chamber of the cylinder 32 through the suction port 35a. When the piston 34 is moved downward in the cylinder 32, the refrigerant in the compression chamber of the cylinder 32 is compressed. In addition, the exhaust valve 37 is opened to allow the compressed refrigerant to be discharged from the compression chamber into the exhaust chamber 33b through the exhaust port 35b.

The linear motor 20 includes a magnet 21 which is placed around the cylinder 32 to linearly move the piston 34 in the cylinder 32. The linear motor 20 also has an outside stator 22 and an inside stator 23. The outside stator 22 is placed around the magnet 21, while the inside stator 23 is placed around the cylinder 32, with an interval defined between the outside and inside stators 22 and 23.

The magnet 21 is interposed between the outside and inside stators 22 and 23 to linearly reciprocate in an axial direction of the stators 22 and 23. The magnet 21 is connected to the piston 34 at an upper end thereof by using a slider 21a, thus linearly moving the piston 34 in the cylinder 32. A resonant spring 24, a kind of plate spring, is mounted to an upper end of the piston 34 to vibrate vertically. The resonant spring 24 enhances the linear moving action of the piston 34 in the cylinder 32.

In addition, the outside stator 22 is arranged around the magnet 21 while being spaced apart from the inside stator 23, with the interval defined between the outside and inside stators 22 and 23. When electricity is supplied from an external power source to the outside stator 22, the outside stator 22 generates a magnetic field, in cooperation with both a plurality of thin metal sheets 231 of the inside stator 23 and a coil 22a wound inside the outside stator 22. To hold the outside stator 22 to the cylinder block 31, a removable locking frame 31b is mounted by using a plurality of locking bolts to a base frame 31a which integrally extends upward and outward from the lower portion of the cylinder block 31. That is, when the outside stator 22 is bolted to the base frame 31a along with the locking frame 31b after the outside stator 22 is arranged between the base frame 31a and the locking frame 31b, the outside stator 22 is firmly mounted to the cylinder block 31.

The inside stator 23 is arranged around the cylinder 32 to allow the magnet 21 to move in the magnetic field generated by the outside stator 22. The construction of the inside stator 23 will be described in detail herein below.

Figure 2:
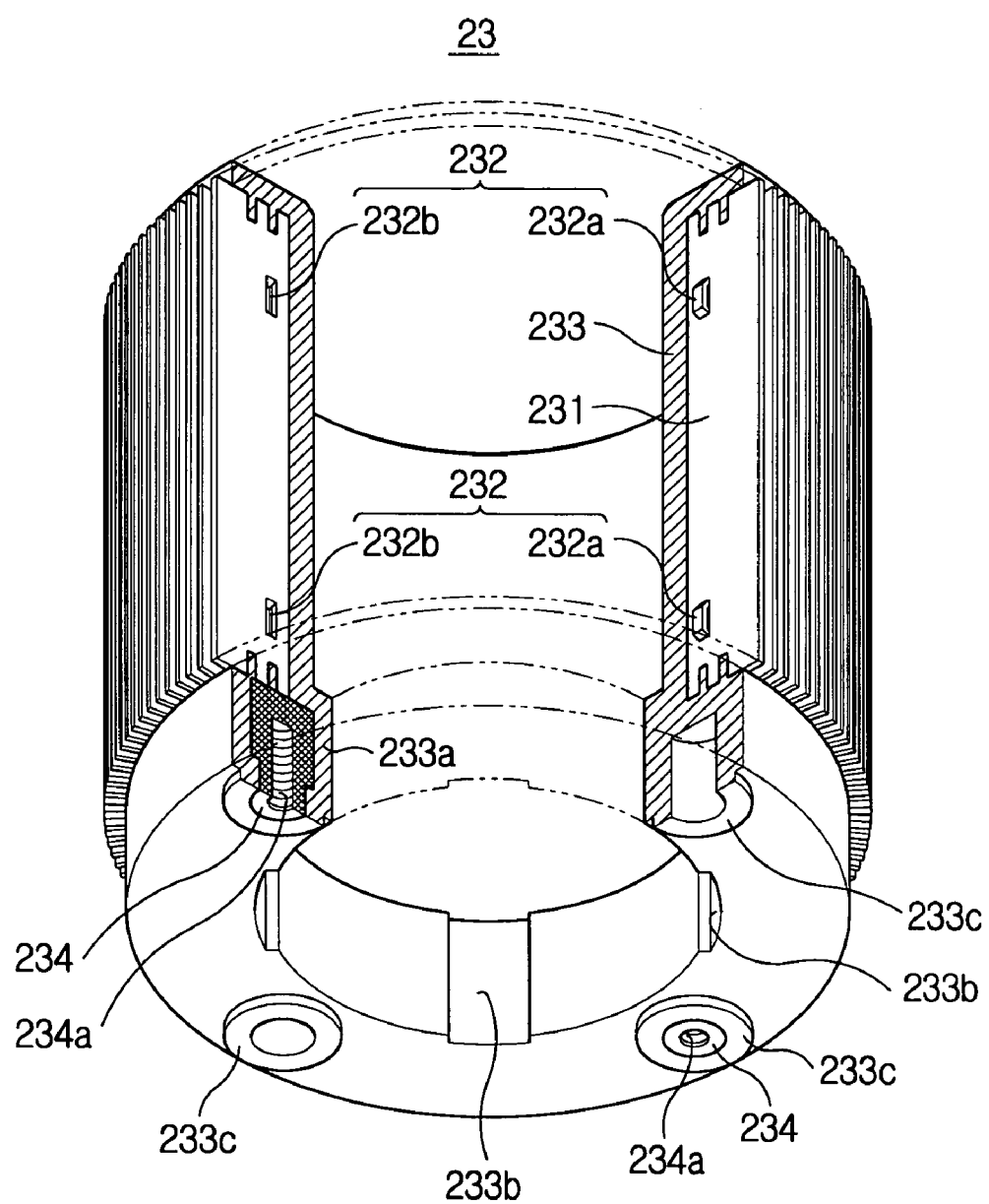
FIG. 2 is a partially sectioned perspective view of an inside stator included in the linear compressor of FIG. 1.

The inside stator 23 has a cylindrical shape so as to be placed around the cylinder 32, as shown in FIG. 2. That is, the inside stator 23 is produced by arranging the plurality of thin metal sheets 231 in a cylindrical arrangement while directing the metal sheets 231 in a radial direction. To prevent the thin metal sheets 231 of the inside stator 23 from being brought into electrical contact with each other, each of the thin metal sheets 231 is covered with an insulating coat.

The thin metal sheets 231 of the inside stator 23 each have a plurality of locking embossments 232 at upper and lower portions thereof. The embossments 232 allow the thin metal sheets 231 to be assembled with each other into a metal sheet assembly. The embossments 232 may be formed on each of the thin metal sheets 231 through an appropriate machining process, such as a pressing process. Each of the embossments 232 thus has a protuberance 232a and a recess 232b on both sides of each of the thin metal sheets 231. The protuberances 232a of the thin metal sheets 231 are thus inserted into the recesses 232b of the neighboring thin metal sheets 231, so that the overall metal sheets 231 are assembled with each other into the metal sheet assembly. In an embodiment of the present invention, two embossments 232 are formed on the upper and lower portions of each of the thin metal sheets 231 to be aligned with each other along an axial line adjacent to an inside edge of the metal sheet 231. Therefore, after the overall metal sheets 231 are assembled with each other at the embossments 232 into the metal sheet assembly, the metal sheet assembly is bent into a desired cylindrical shape such that the inside edges of the metal sheets 231 adjacent to the embossments 232 form an inner surface of the cylindrical inside stator 23.

To hold the thin metal sheets 231 at desired positions in the inside stator 23, which is fabricated by bending the metal sheet assembly into the cylindrical shape, a holder 233 is provided on the inside stator 23. The holder 233 holds the upper edges, inside edges and lower edges of the thin metal sheets 231, which are arranged in the cylindrical arrangement. That is, the thin metal sheets 231 in the metal sheet assembly, which is bent into the cylindrical shape, are insert-molded to the holder 233 so as to be held in the desired positions thereof in the cylindrical arrangement.

In an embodiment of the invention the holder 233 is made of a resin material, such as plastic, which is nonconductive and easily molded. Due to the holder 233, the thin metal sheets 231 are reliably held in the desired positions in the cylindrical arrangement while maintaining an electrically insulated state between the metal sheets 231, so that it is possible to prevent eddy currents from being generated in the inside stator 23. Thus, the linear compressor having the inside stator 23 of the present invention does not suffer any eddy current loss.

A thick part 233a, having an inner diameter corresponding to an outer diameter of the cylinder 32, is provided along a lower end of an inner surface of the holder 233. Due to the thick part 233a of the holder 233, the holder 233, except for the thick part 233a, is spaced apart from an outer surface of the cylinder 32, with a cylindrical gap defined between the inner surface of the holder 233 and the outer surface of the cylinder 32, when the inside stator 23 is placed around the cylinder 32. During an operation of the linear compressor, heat is effectively dissipated from the cylinder 32 to an outside of the cylinder 32 through the cylindrical gap between the inner surface of the holder 233 and the outer surface of the cylinder 32.

In addition, a plurality of oil grooves 233b are formed on the inner surface of the thick part 233a of the holder 233 in vertical directions at positions angularly spaced apart from each other at regular intervals to guide oil from the cylindrical gap between the inside stator 23 and the cylinder 32 in a downward direction. A plurality of projections 233c are provided on a lower surface of the holder 233 while being angularly spaced apart from each other at regular intervals, so that the inside stator 23 is placed on the cylinder block 31 while being supported by the projections 233c, with a horizontal gap defined between the lower end of the holder 233 of the inside stator 23 and the cylinder block 31. The horizontal gap, defined between the lower end of the holder 233 and the cylinder block 31, acts as a passage to allow oil to pass. Therefore, the oil, which flows into the cylindrical gap between the inner surface of the holder 233 and the outer surface of the cylinder 32, sequentially passes through the oil grooves 233b formed on the inner surface of the thick part 233a and through the horizontal gap defined between the lower end of the holder 233 and the cylinder block 31 by the projections 233c, prior to being drained downward to an outside of the cylinder block 31.

Each of the thin metal sheets 231 has two locking notches 231a on each of the upper and lower edges thereof, thus being reliably locked to the holder 233 at the locking notches 231a during an insert-molding process of forming the holder 233 by using a resin material. That is, during the insert-molding process of forming the holder 233, the molten resin material fills the locking notches 231a formed at the upper and lower edges of the thin metal sheets 231. The resin material is, thereafter, hardened to allow the metal sheets 231 to be firmly held by the holder 233. It is thus possible to prevent the metal sheets 231 from being undesirably removed from the holder 233.

The inside stator 23 has a plurality of locking members 234 which lock the inside stator 23 to the cylinder 32. The locking members 234 are each internally-threaded at an end thereof to have an internally-threaded hole 234a into which a fastening member, such as a setscrew 38, is tightened to lock the inside stator 23 to the cylinder 32. Each of the locking members 234 is made of a metal that has a higher strength than the resin material of the holder 233. The use of the metal locking members 234 in the holder 233 is necessary because the fastening members, such as the setscrews 38 used to lock the inside stator 23 to the cylinder 32, are made of a metal having a higher strength than the resin material of the holder 233. Therefore, when the metal fastening members are directly tightened to the holder 233 without using the metal locking members 234, the resin holder 233 may be abraded or broken at fastened parts thereof in accordance with an operation of the linear compressor for lengthy periods. In such a case, the locking state of the inside stator 23 relative to the cylinder 32 may be loosened, so that the inside stator 23 of the present invention uses the metal locking members 234 in the holder 233. In the embodiment illustrated in the drawings, the projections 233c are provided around the internally-threaded holes 234a of the locking members 234.

In an embodiment of the invention, two locking members 234 are set on the lower end of the holder 233 at diametrically opposite positions through the insert-molding process wherein the two locking members 234 along with the thin metal sheets 231 are integrated with the holder 233. As described above, the locking members 234 each have the internally-threaded hole 234a at the end thereof to allow the setscrew 38 to be tightened to each of the locking members 234. The inside stator 23 is thus locked to the cylinder 32 by using the setscrews 38.

In an embodiment of the invention, the holder 233 has a thickness of 1 mm-3 mm at the upper portion thereof which covers the upper edges of the thin metal sheets 231. The above-mentioned thickness of the upper portion of the holder 233 is determined such that the molten resin material easily flows through a part of a cavity defined in a mold M to form the upper portion of the holder 233 prior to filling a remaining part of the cavity during the insert-molding process, and the resulting upper portion of the holder 233 does not disturb a reciprocation of the slider 21a during the operation of the linear compressor.

The linear compressor of the present invention having the above-mentioned construction is produced as follows. A method of producing the linear compressor includes several operations to manufacture the inside stator 23. That is, the method of producing the linear compressor includes: forming a plurality of embossments 232 on a metal plate O; cutting the metal plate O having the embossments 232 through a pressing process to produce a plurality of thin metal sheets 231; assembling the plurality of thin metal sheets 231 with each other by using the embossments 232 to provide a metal sheet assembly; bending the metal sheet assembly into a cylindrical shape to allow the thin metal sheets 231 to be arranged in a cylindrical arrangement; and forming a holder 233 to hold the thin metal sheets 231 in desired positions thereof in the cylindrical arrangement, through an insert-molding process.

Figure 3:
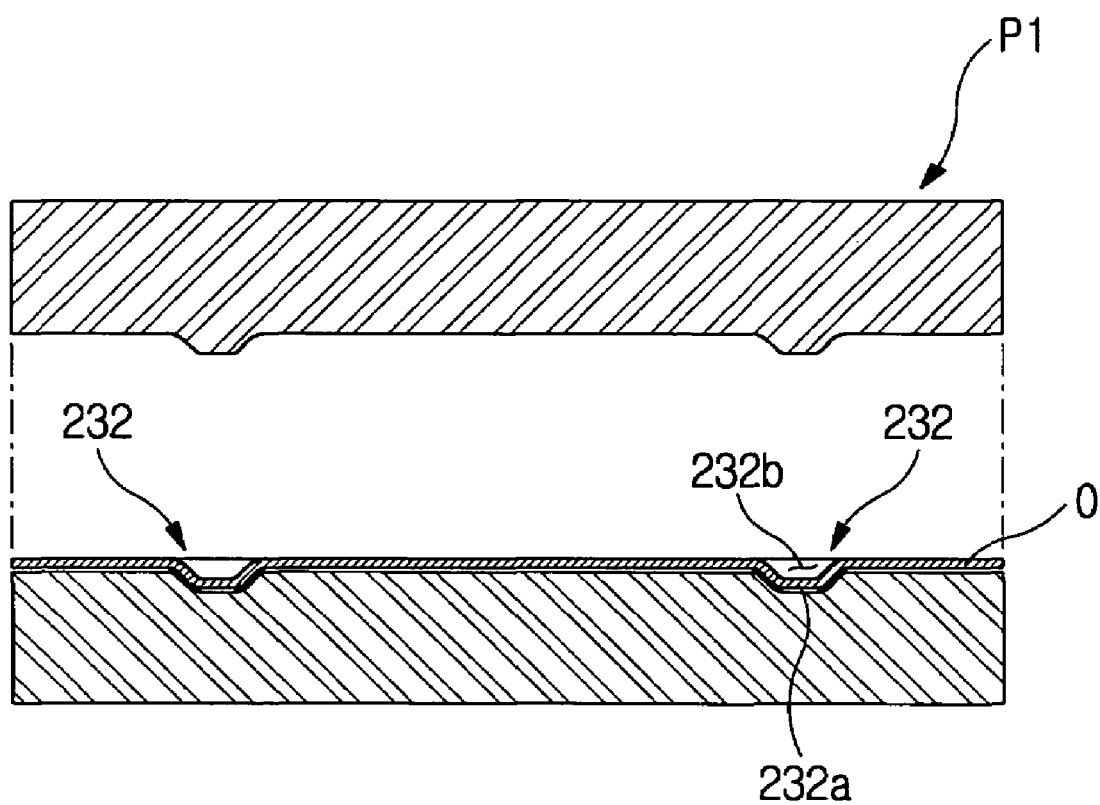
FIG. 3 is a sectional view to illustrate an embossing operation in which a plurality of locking embossments are formed on a metal plate in a method of producing the linear compressor of the present invention.

In the operation of forming of the embossments 232 on the metal plate O, the metal plate O is subjected to a pressing process to form the embossments 232 by using a first press P1 which is an embossing press, as shown in FIG. 3. In such a case, each of the embossments 232 forms a protuberance 232a and a recess 232b on both sides of the metal plate O.

Figure 4:
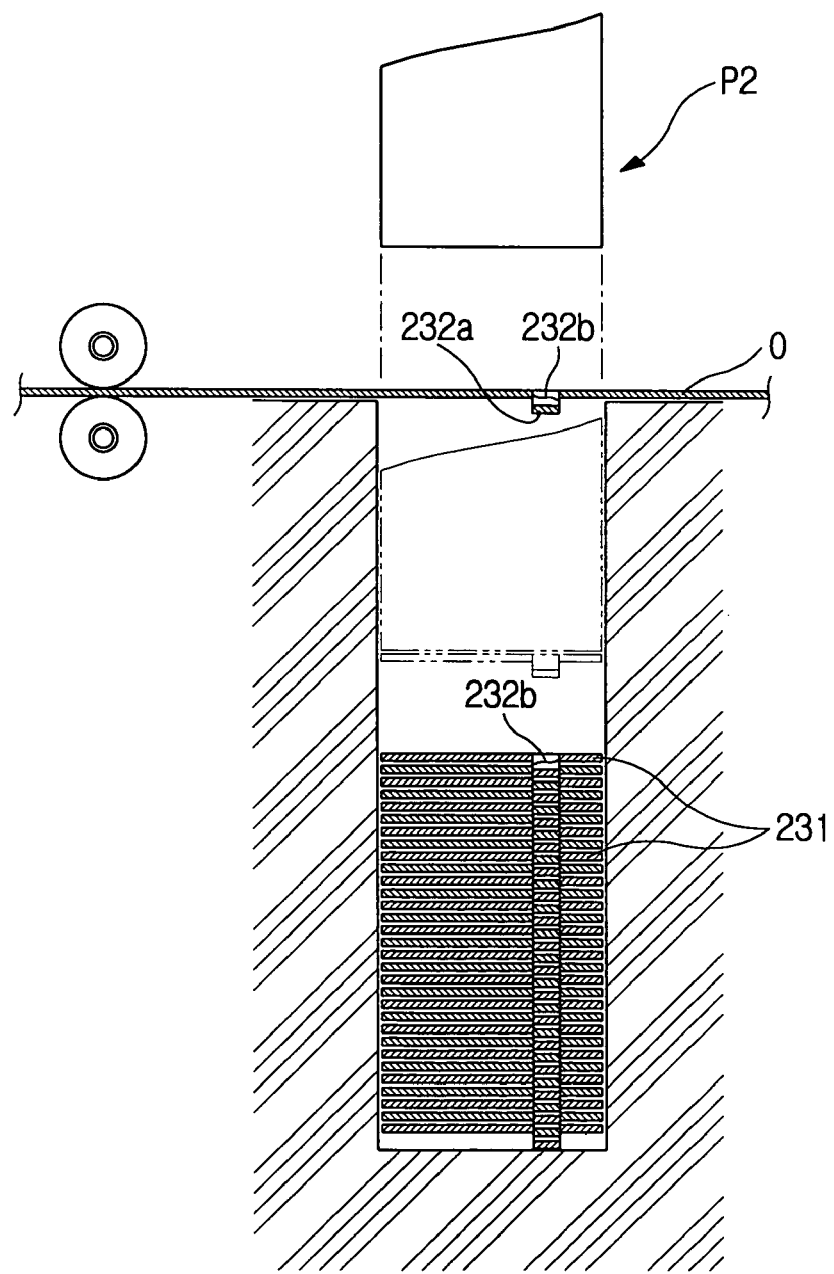
FIG. 4 is a view to illustrate a cutting and stacking operation in which a plurality of thin metal sheets are produced from the embossed metal plate of FIG. 3 and, at the same time, the thin metal sheets are stacked to produce a metal sheet assembly in the method of the present invention.

The metal plate O having the embossments 232 is, thereafter, cut into a plurality of pieces one by one to produce the thin metal sheets 231, as shown in FIG. 4. To produce the thin metal sheets 231, the metal plate O having the embossments 232 is fed to a second press P2 which is a cutting press to cut the metal plate O into the pieces having a predetermined size. Immediately after each of the thin metal sheets 231 is cut from the metal plate O by using the second press P2, the thin metal sheet 231 is layered on top of an uppermost thin metal sheet of the metal sheet assembly vertically placed at a position under the second press P2. In such a case, each of the thin metal sheets 231 is pushed downward by the second press P2 to be layered on top of the uppermost thin metal sheet of the metal sheet assembly, just after the thin metal sheet 231 is cut from the metal plate O by the second press P2. The thin metal sheets 231 in the metal sheet assembly are locked to each other by the embossments 232 thereof.

In an embodiment of the present invention, the cutting of the metal plate O having the embossments 232 through the pressing process to produce the thin metal sheets 231, and the layering and assembling of the thin metal sheets 231 with each other by the embossments 232 to provide the metal sheet assembly are executed at the same time by using the second press P2. However, it should be understood that the cutting of the metal plate O into the thin metal sheets 231, and the layering and assembling of the thin metal sheets 231 into the metal sheet assembly may be variously changed, without affecting the functioning of the present invention.

Figure 5:
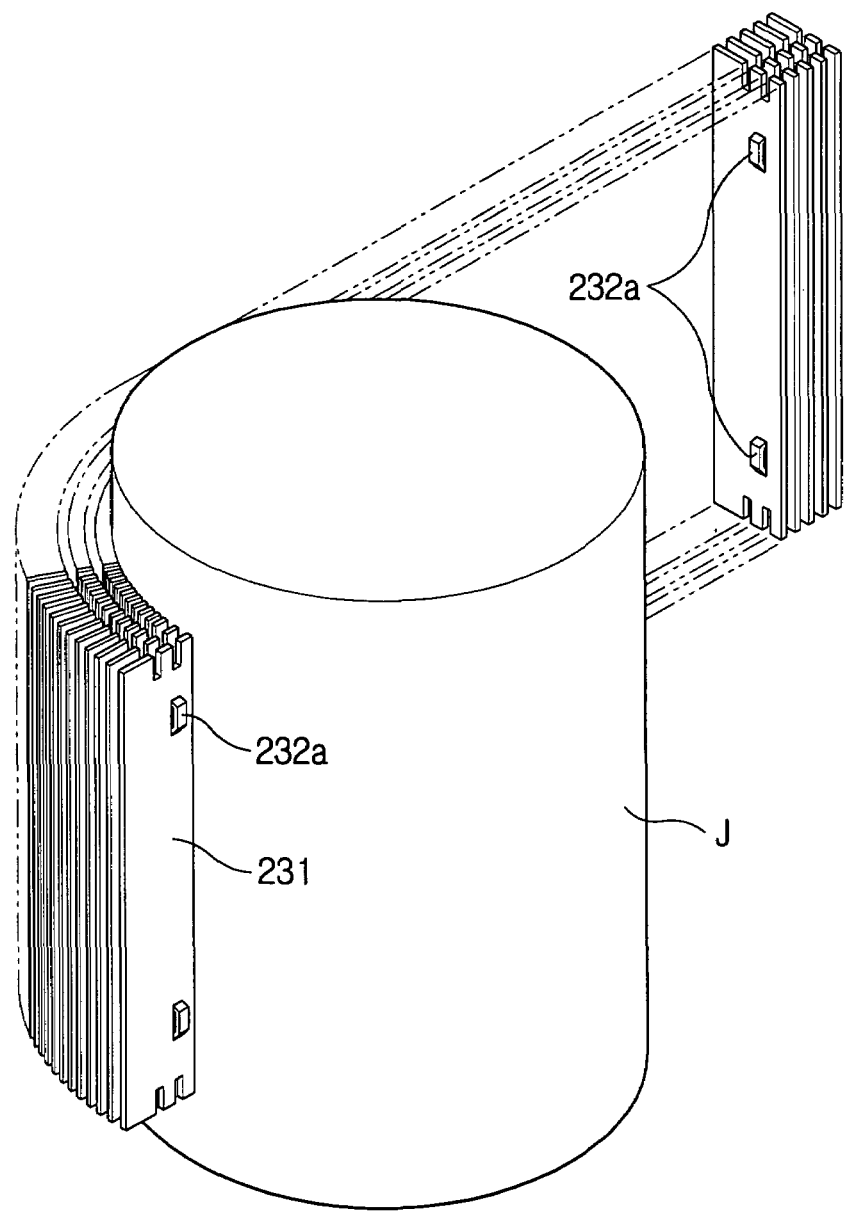
FIG. 5 is a view to illustrate a bending operation in which the metal sheet assembly is bent around a cylindrical jig in the method of the present invention.

The metal sheet assembly with the thin metal sheets 231 locked to each other by using the embossments 232 is, thereafter, bent into the cylindrical shape, as shown in FIG. 5, to allow the thin metal sheets 231 to be arranged in the cylindrical arrangement. To bend the metal sheet assembly into the cylindrical shape, a cylindrical jig J is provided. The metal sheet assembly is bent around the jig J such that the inside edges of the thin metal sheets 231 adjacent to the embossments 232 are supported against an outer surface of the jig J.

After the metal sheet assembly is bent into the cylindrical shape around the jig J to allow the thin metal sheets 231 to be arranged in the cylindrical arrangement, the protuberances 232a of the embossments 232 of a thin metal sheet 231 placed at a first end of the metal sheet assembly are locked into the recesses 232b of the embossments 232 of another metal sheet 231 placed at a second end of the metal sheet assembly. Therefore, the cylindrical arrangement of the thin metal sheets 231 is accomplished.

Figure 6:
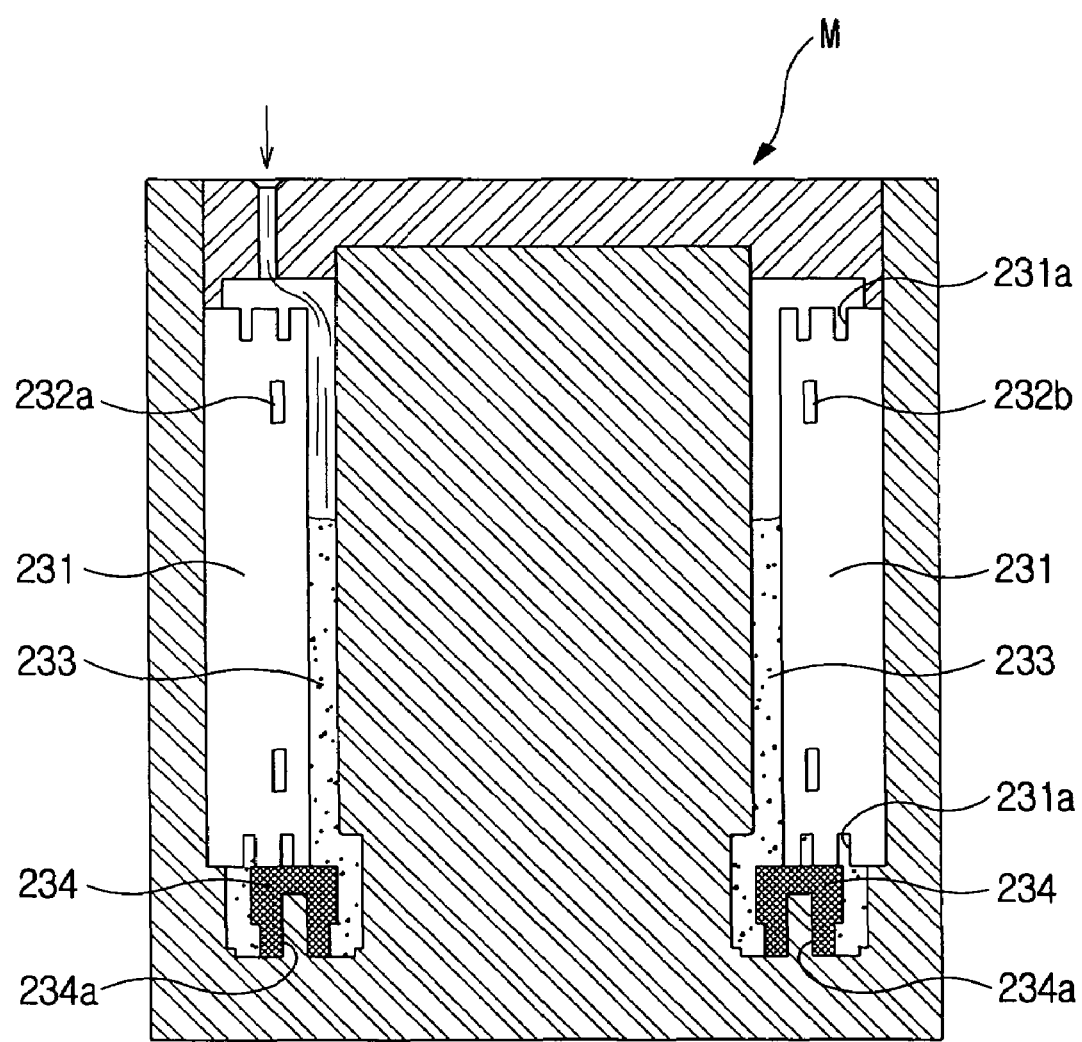
FIG. 6 is a view to illustrate a holder molding operation in which a holder to hold the thin metal sheets is produced in the method of the present invention.

Thereafter, the thin metal sheets 231 which are arranged in the cylindrical arrangement are set in the mold M, and a molten resin material is injected into the cavity of the mold M having the thin metal sheets 231, as shown in FIG. 6, thus forming the holder 233 which firmly holds the thin metal sheets 231 in desired positions in the cylindrical arrangement. The inside stator 23 having the thin metal sheets 231 is thus produced.

The linear compressor of the present invention is produced and operated as follows.

To produce the inside stator 23 of the linear compressor, a plurality of embossments 232 are formed on a metal plate O, prior to cutting the metal plate O having the embossments 232 to produce a plurality of thin metal sheets 231. Thereafter, the plurality of thin metal sheets 231 are layered and assembled with each other by using the embossments 232 to provide a metal sheet assembly, prior to bending the metal sheet assembly into a cylindrical shape. Thereafter, a plurality of locking members 234 are arranged at desired positions on a surface formed by the lower ends of the thin metal sheets 231. The thin metal sheets 231 with the locking members 234 are installed in a mold M for an insert-molding process. Thereafter, a molten resin material is injected into the cavity of the mold M and is hardened, thus forming the holder 233. The holder 233 covers the upper edges, inside edges and lower edges of the thin metal sheets 231, thus firmly holding the thin metal sheets 231 in desired positions in the cylindrical arrangement.

In the inside stator 23, the holder 233 is made of a nonconductive resin material, so that the holder 233 does not allow the thin metal sheets 231 to be in electrical contact with each other while holding the thin metal sheets 231. In addition, the molten resin material fills the locking notches 231a of the thin metal sheets 231 during the insert-molding process, the thin metal sheets 231 are firmly held by the holder 233 by the resin material filling the locking notches 231a.

The inside stator 23 is fastened to the cylinder block 31 by means of the fastening members, such as the setscrews 38, which pass through the cylinder block 31 to be tightened to the internally-threaded holes 234a of the locking members 234. Therefore, it is easy to install the inside stator 23 in the linear compressor.

As apparent from the above description, the present invention provides a linear compressor and a method of producing the linear compressor. In an inside stator of a linear motor of the linear compressor, a plurality of thin metal sheets which are arranged in a cylindrical arrangement are insert-molded to a holder that is made of a nonconductive resin material, so that the thin metal sheets are prevented from being in electrical contact with each other. Therefore, the linear compressor does not generate eddy currents in the inside stator, and prevents an eddy current loss.

In addition, the inside stator is fastened to a cylinder block by means of a fastening member, such as a setscrew, which passes through the cylinder block to be tightened to an internally-threaded hole of a locking member insert-molded to the holder. Therefore, work efficiency is improved during a process of producing the linear compressor.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A linear compressor, comprising:
   a cylinder having a piston therein;
   a magnet arranged around the cylinder to actuate the piston; and
   an inside stator arranged around the cylinder to be placed inside the magnet, the inside stator including a plurality of metal sheets arranged in a cylindrical arrangement and a holder to which the metal sheets are insert-molded, with upper edges, inside edges and lower edges of the metal sheets being covered with the holder to allow the metal sheets to be held in position in the cylindrical arrangement,
   wherein each of the metal sheets has at least one embossment, which forms a protuberance and a recess on both sides of each of the metal sheets, so the embossment of each of the metal sheets is assembled with the embossment of a neighboring metal sheet.

2. The linear compressor according to claim 1, wherein each of the metal sheets comprises:
   upper and lower edges; and
   a locking notch on at least one of the upper and lower edges to lock the metal sheets to the holder to prevent the metal sheets from being removed from the holder.

3. The linear compressor according to claim 1, wherein the holder comprises a locking member which is insert molded to the holder and internally-threaded at an end thereof to allow the inside stator to be locked to the cylinder at the locking member.

4. The linear compressor according to claim 3, further comprising:
   a lower portion thereof, which covers the lower edges of the metal sheets; and
   an upper portion thereof, which covers the upper edges of the metal sheets, wherein the holder is thicker at the lower portion than the upper portion to allow the holder to receive the locking member in the lower portion.

5. The linear compressor according to claim 4, wherein the upper portion of the holder has a thickness of 1 mm-3 mm at the upper portion thereof to cover the upper edges of the metal sheets.

6. The linear compressor according to claim 1, wherein the holder comprises a nonconductive resin material.

7. The linear compressor according to claim 1, further comprising:
   a thick part provided along an end of an inner surface of the holder to allow the holder to be placed around the cylinder; and
   a gap defined between the inner surface of the holder and an outer surface of the cylinder.

8. The linear compressor according to claim 7, wherein the inside stator is arranged in a vertical direction, and comprising an oil groove, formed on the thick part of the holder in the vertical direction, to allow oil to flow along the thick part in the vertical direction.

9. The linear compressor according to claim 8, further comprising:
   a projection provided on a lower end of the holder to allow the holder to be placed on a cylinder block having the cylinder; and
   a gap defined between the lower end of the holder and the cylinder block by the projection.

10. The linear compressor according to claim 1, wherein the embossment of each of the metal sheets comprises a plurality of embossments which are formed along an axial line adjacent to an inside edge of each of the metal sheets arranged in the cylindrical arrangement.

* * * * *